(12) United States Patent
Le Coq

(10) Patent No.: US 11,203,999 B2
(45) Date of Patent: Dec. 21, 2021

(54) HYDRAULIC CONTROL SYSTEM FOR A THRUST REVERSER COMPRISING A DATA CONCENTRATOR MODULE

(71) Applicant: Safran Nacelles, Gonfreville l'Orcher (FR)

(72) Inventor: Vincent Pierre Germain Le Coq, Gonfreville l'Orcher (FR)

(73) Assignee: Safran Nacelles, Gonfreville l'Orcher (FR)

(*) Notice: Subject to any disclaimer, the term of this patent is extended or adjusted under 35 U.S.C. 154(b) by 186 days.

(21) Appl. No.: 16/008,200

(22) Filed: Jun. 14, 2018

(65) Prior Publication Data
US 2018/0291838 A1    Oct. 11, 2018

Related U.S. Application Data

(63) Continuation of application No. PCT/FR2016/053302, filed on Dec. 9, 2016.

(30) Foreign Application Priority Data

Dec. 14, 2015    (FR) .................................. 15/62308

(51) Int. Cl.
*F02K 1/76*    (2006.01)
*B64D 33/04*    (2006.01)

(52) U.S. Cl.
CPC .............. *F02K 1/763* (2013.01); *B64D 33/04* (2013.01); *F02K 1/766* (2013.01);
(Continued)

(58) Field of Classification Search
CPC . F02K 1/76; F02K 1/763; F02K 1/766; F05D 2260/406; F05D 2260/84; F05D 2270/64; F05D 2270/52; F05D 2270/56
See application file for complete search history.

(56) References Cited

U.S. PATENT DOCUMENTS

| | | | |
|---|---|---|---|
| 6,439,504 B1 * | 8/2002 | Ahrendt | ................. F02K 1/763 239/265.19 |
| 7,370,468 B2 | 5/2008 | Colotte et al. | |

(Continued)

FOREIGN PATENT DOCUMENTS

EP    0843089    5/1998

OTHER PUBLICATIONS

International Search Report for International Application PCT/FR2016/053302, dated May 9, 2017.

*Primary Examiner* — Andrew H Nguyen
(74) *Attorney, Agent, or Firm* — Burris Law, PLLC

(57) ABSTRACT

The present disclosure relates to a hydraulic control system for a thrust reverser of an aircraft turbofan nacelle. The hydraulic control system includes devices for actuating and controlling the reverser having hydraulic locks and cylinders, the corresponding hydraulic solenoid valves, and sensors. The turbofan includes a full-authority electronic computer or aircraft having an avionics computer that gives reverse thrust commands. The system further includes an electronic concentration module, different from the computer, which concentrates the data relating to the operation of the reverser actuation and control devices. The module includes internal contact switches for controlling the solenoid valves, a device for monitoring the sensors, a device for analog or digital processing of the data, and a bus for communication with the computer.

8 Claims, 1 Drawing Sheet

(52) U.S. Cl.
CPC ...... *F05D 2270/54* (2013.01); *F05D 2270/64* (2013.01); *Y02T 50/60* (2013.01)

(56) References Cited

U.S. PATENT DOCUMENTS

| | | | | |
|---|---|---|---|---|
| 8,583,294 | B2* | 11/2013 | Villano | B64C 13/505 |
| | | | | 701/3 |
| 9,057,343 | B2* | 6/2015 | McKay | F02K 1/16 |
| 2004/0068977 | A1* | 4/2004 | McKay | F02K 1/763 |
| | | | | 60/226.2 |
| 2013/0332025 | A1* | 12/2013 | Ziarno | G05B 23/0213 |
| | | | | 701/33.4 |
| 2015/0090810 | A1 | 4/2015 | Lallement et al. | |

* cited by examiner

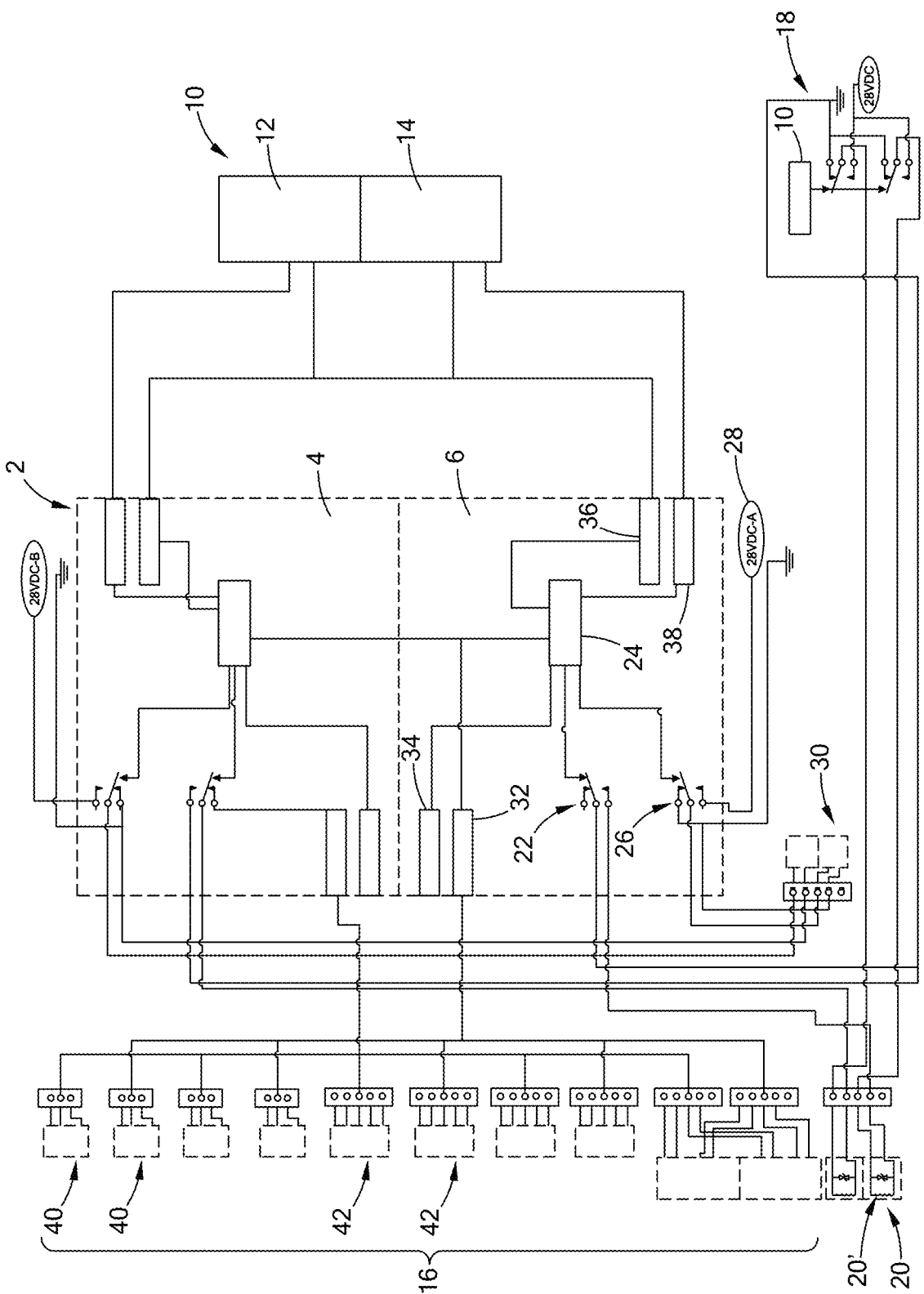

HYDRAULIC CONTROL SYSTEM FOR A THRUST REVERSER COMPRISING A DATA CONCENTRATOR MODULE

CROSS-REFERENCE TO RELATED APPLICATIONS

This application is a continuation of International Application No. PCT/FR2016/053302, filed on Dec. 9, 2016, which claims priority to and the benefit of FR 15/62308 filed on Dec. 14, 2015. The disclosures of the above applications are incorporated herein by reference.

FIELD

The present disclosure relates to a hydraulic drive system of a thrust reverser for an aircraft nacelle receiving a turbojet engine, as well as an aircraft nacelle including such a hydraulic drive system.

BACKGROUND

The statements in this section merely provide background information related to the present disclosure and may not constitute prior art.

The motors of aircraft are generally integrated in a nacelle forming a generally circular outer shell, comprising in the inside the turbojet engine disposed along the longitudinal axis of this nacelle.

The turbojet engine receives fresh air coming from the front side, and discharges from the rear side hot gases coming from the combustion of the fuel, which give a certain thrust. For bypass turbojet engines, fan blades disposed about the motor generate a significant secondary cold air flow along an annular flow path passing between the motor and the nacelle, which adds a high thrust.

Some nacelles include a thrust reverser system which closes at least partially the annular cold air flow path, and discharges the secondary flow radially outwards, by redirecting it forwards in order to generate a reverse braking thrust of the aircraft.

The thrust reversers may be particularly with doors or cascades performing the reversal of the cold air flow. Originally, they were equipped with hydraulic cylinders driven by distributors to actuate these doors or cascades.

Generally, aircraft include a full authority electronic computer ensuring the operation of a motor, or an electronic avionics computer, which also pilots the thrust reverser system.

In order to replace the hydraulic drive circuit of the thrust reverser, a known drive type, presented in particular by the document EP-A1-0843089, includes electric cylinders comprising an electric motor driving in rotation by a reducer a screw receiving a nut, as well as electric blocking locks and electric sensors which are connected to an electronic drive unit exchanging information with the full authority electronic computer.

Particularly, the electronic drive unit may be integrated in the full authority electronic computer.

However, for the hydraulically-driven thrust reversers, these systems are always piloted only by the full authority control computer of the motorization or the avionics computer, which leads to a number of issues.

The hydraulic drive system of the thrust reverser includes in particular hydraulic cylinders, position blocking hydraulic locks, as well as drive solenoid valves of these members, and sensors. This equipment is different according to the used thrust reverser technology, which may be in particular with cascades or flaps.

The pilot computer has the function of monitoring the different states of the active components, and delivering a drive logic of these components.

However, the full authority computer is a complex set carrying out many important functions for the operation of the motorization or of the aircraft, which is highly secure, its development as well as changes are long and delicate to achieve. Particularly, it is difficult to adapt it to various thrust reverser technologies, which require very different drive logics.

The control and the operation of the hydraulic drive system should take into account the interface stresses of the full authority computer or of the avionics computer, comprising in particular a number of interface paths which may be limited, or a defined type of path which may be discrete or analog. These stresses may reduce the diagnostic capabilities and the sharpness of the control logics, which limits the operational availability of the hydraulic drive system.

Particularly, some aircraft such as regional business aircraft include a full authority computer having a single channel for this drive type, and a monitoring which is done by a multiplexed channel.

Furthermore, the operation logic of the hydraulic drive system being integrated into the full authority computer, this logic becomes complex to implement, which complicates its development cycle, as well as the interventions in case of modification to be made.

Moreover, the distance between the full authority computer or the avionics computer, and the hydraulic drive system complicates the processing of the electromagnetic compatibilities "EMC."

SUMMARY

The present disclosure provides a hydraulic drive system of a thrust reverser of a bypass turbojet engine nacelle for an aircraft, comprising actuating and control devices of the thrust reverser including hydraulic cylinders and locks, their hydraulic supply solenoid valves, and sensors, the turbojet engine including a full authority electronic computer or the aircraft including an avionics computer which gives thrust reversal orders, the hydraulic drive system being remarkable in that it includes an electronic concentration module distinct from the computer, achieving a concentration of all data related to the operation of the actuating and control devices of the thrust reverser, the module comprising internal drive contactors of the solenoid valves, a device for monitoring the sensors, a data processing device for analogically or digitally processing the data carrying out in particular the sequencing of the actuating devices, and a communication bus to the computer.

An advantage of the hydraulic drive system is that its electronic concentration module can be brought close to the actuating and control devices, which simplifies the communications to these devices, and limits in particular the electromagnetic compatibility issues. Particularly, the internal drive contactors of the solenoid valves allow carrying out closely the control of these solenoid valves with a high level of safety.

Moreover, a device for analog or digital processing of the data of the concentration module allows discharging some functions from the computer, which simplifies the development of these functions that may be done independently of the computer.

The hydraulic drive system according to the present disclosure may further include one or more of the following features, which may be combined together.

Advantageously, the concentration module includes two channels disposed in parallel, provided to be each connected to two corresponding channels of the computer. A redundancy of all the functions is thus obtained with these two channels.

Advantageously, some internal contactors piloted by the data processing device, drive their solenoid valves in a shared manner with the computer. By this double piloting of both the concentration module and the computer, improved safety for this drive is obtained.

Particularly, the shared drive of the solenoid valves may comprise, upstream, a command by the computer, and then downstream, a command by the data processing device.

In this case, the solenoid valves may include a winding connected, on one side, to the internal contactor and, on another side, to an external contactor connected to the computer.

Advantageously, the concentration module includes internal contactors driving independently some solenoid valves, only by the data processing device. Thus, an independence of the concentration module is obtained to perform maneuvers.

Advantageously, the concentration module includes in parallel to the communication bus, a card allowing to exchange analog information with the full authority computer.

Advantageously, the concentration module includes a device for monitoring signals coming from sensors which are not directly linked to the operation of the thrust reverser. New functions complementary to the drive functions of the thrust reverser may be added.

Particularly, these monitoring devices may receive signals of temperature, of positioning of members of the nacelle, or of stresses of the structure of the nacelle.

The present disclosure also provides a turbojet engine nacelle for the motorization of an aircraft, including a thrust reverser equipped with a hydraulic drive system, comprising any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 shows an electronic concentration module specific to a hydraulically-driven thrust reverser, comprising two symmetrical portions forming respectively a first channel and a second channel achieving independently similar functions in order to improve safety by a redundancy according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an electronic concentration module 2 specific to a hydraulically-driven thrust reverser, comprising two symmetrical portions forming respectively a first channel 4 and a second channel 6 achieving independently similar functions in order to improve safety by redundancy. The first channel 4 or the second channel 6 may be alternatively used, in case of failure of the other channel.

The motorization of the aircraft includes a full authority electronic computer 10, also called "FADEC" (Full Authority Digital Engine Control), comprising in the same manner a first channel 12 and a second channel 14 being able to work independently in order to provide redundancy. Each channel 12, 14 is connected to both channels 4, 6 of the electronic concentration module 2, to be able to exchange with each other.

The full authority electronic computer 10 is an interface system between the cockpit of the aircraft and the turbojet engine, allowing to ensure the operation of the machine.

The concentration module 2 includes different electric power supply secure systems. The concentration module 2 is connected to all actuating devices of the thrust reverser, including hydraulic cylinders and hydraulic locks, not shown in FIG. 1, and supply solenoid valves 20, 30 of these components.

The concentration module 2 is also connected to all sensors 16 related to the operation of the thrust reverser, in order to receive information on the state of the thrust reverser.

The concentration module 2 includes an analog or digital offset logic making a summary of the data related to the operation of the thrust reverser, in order to drive the thrust reverser in response to the piloting requested by the full authority computer 10.

In return, the concentration module 2 informs the full authority computer 10 of the state of the thrust reverser, as well as the different breakdowns which might appear.

In addition to the full authority computer 10 and in order to obtain an additional segregation of the thrust reverser drive to improve safety, the shared drive of at least one drive hydraulic solenoid valve 20 of hydraulic actuators of the thrust reverser is generally used, by an avionics drive computer which is in connection with the throttle control of the cockpit engaged in the thrust reversal position.

Thus, for each channel 4, 6 of the concentration module 2, the avionics drive computer closes an external contactor 18 connected to the computer 10, which delivers a DC Voltage to a pole of a coil of the solenoid valve 20, while the concentration module 2 closes, in a sequencing logic developed by an internal programmable logic controller (i.e., a data processing device) 24, the supply of the coil of the solenoid valve 20 by grounding its second pole by a first internal contactor 22.

The at least one solenoid valve 20 includes a winding 20' connected, on one side, to the at least one internal drive contactor 22 and, on another side, to an external contactor 18 to the concentration module 2. In this manner, a first power supply of each solenoid valve 20 is obtained, with a shared drive comprising, first upstream, a command by the avionics drive computer via the external contactor 18, and then downstream, a command by the concentration module 2.

For each channel 4, 6, an autonomous power supply 28 is connected to a second internal contactor 26 driven by the programmable logic controller 24, to supply a pole of a coil of a second external relay of a drive solenoid valve 30 of hydraulic actuators of the thrust reverser. The other end of the coil remains permanently grounded.

In this manner, a second power supply of the solenoid valves 30 is obtained, with an internal drive depending only on the concentration module 2.

For each channel 4, 6, the concentration module 2 includes a first monitoring device 32 receiving the signals coming from different proximity sensors 40 and linear position sensors 42, which allow to permanently follow the state of different movable members of the thrust reverser, and a second monitoring device 34 receiving other signals coming from the nacelle to be monitored, such as, for example, the temperature of a particular area, a positioning state of maintenance cowls, or a stress state of the structure of the nacelle.

For each channel 4, 6, the programmable logic controller 24 is connected by a communication bus 36 to each of the paths 12, 14 of the full authority computer 10, in order to receive the orders for the drive of the thrust reverser, and to transmit in return information thereto on the state of the thrust reverser.

In parallel with this communication bus 36, each channel 4, 6 includes a card 38 configured to exchange analog information with each of the paths 12, 14 of the full authority computer 10.

By this system, it is particularly possible to inform the full authority computer 10 of breakdowns or failures of the thrust reverser.

Advantageously, a universal communication bus 36 is used for accepting different exchange protocols coming from the full authority computer 10, in order to make a standard for the thrust reverser allowing to be easily adapted to several manufacturers of motorization or aircraft, which allows limiting the costs.

Generally, the concentration module 2 allows performing complex functions related to the thrust reverser without loading the full authority computer 10, such as, for example, improvement of the control and of the monitoring of the thrust reverser, which increases its operational availability.

The concentration module 2 may particularly, from a simple general drive order of the thrust reverser, drive and monitor complex sequences of maneuver of the different actuators of this thrust reverser.

The concentration module 2 also allows for easy modifications to the control of the thrust reverser, or can be adapted for different types of thrust reversers, such as, for example, cascade or flap systems, without significant modifications to the full authority computer 10, which are generally difficult to achieve.

Thus, a large number of stresses of an existing full authority computer 10 are eliminated, such as, for example, a reduced number of paths, which are generally required for single-channel computers.

It is also easier to add new functions supported by the concentration module 2, such as, for example, the measurement of temperatures to be monitored in a particular area of the nacelle, a position state of maintenance cowls or a stress state.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A hydraulic drive system of a thrust reverser of a nacelle of a bypass turbojet engine for an aircraft, comprising actuating and control devices of the thrust reverser including hydraulic cylinders and locks having first hydraulic supply solenoid valves, and sensors, the hydraulic drive system comprising:
   an electronic concentration module distinct from a computer, operable to concentrate data related to an operation of the actuating and control devices of the thrust reverser, the computer being a full authority computer for the turbojet engine or an avionics computer for the aircraft for providing thrust reversal orders, the electronic concentration module comprising:
      a plurality of internal drive contactors for driving the first hydraulic supply solenoid valves;
      a monitoring device for monitoring the sensors;
      a data processing device configured to process sequencing of the actuating and control devices; and
      a communication bus connected to the computer,
   wherein at least one internal drive contactor of the plurality of internal drive contactors is piloted by the data processing device and, together with the computer, drives at least one of the first hydraulic solenoid valves such that the at least one of the first hydraulic solenoid valves is driven by firstly, a command by the computer and then, secondly, a command by the data processing device, and
   wherein the at least one of the first solenoid valves includes a winding connected, on one side, to the at least one internal drive contactor and, on another side, to an external contactor connected to the computer.

2. The hydraulic drive system according to claim 1, wherein the electronic concentration module includes two channels disposed in parallel, each channel connected to corresponding channels of the computer.

3. The hydraulic drive system according to claim 1, wherein another ones of the internal drive contactors of the concentration module independently drive second hydraulic supply solenoid valves, such that the second hydraulic supply solenoid valves are driven only by the data processing device.

4. The hydraulic drive system according to claim 1, wherein the concentration module includes a card parallel to the communication bus, the card configured to exchange analog information with the full authority computer.

5. The hydraulic drive system according to claim 1, wherein the concentration module includes the monitoring device configured to receive and monitor signals coming from the sensors not directly linked to an operation of the thrust reverser.

6. The hydraulic drive system according to claim 5, wherein the sensor signals are temperature signals, positioning signals of members of the nacelle, or stress signals of a structure of the nacelle.

7. A turbojet engine nacelle for an aircraft comprising a thrust reverser equipped with a hydraulic drive system according to claim 1.

8. A hydraulic drive system of a thrust reverser of a nacelle of a bypass turbojet engine for an aircraft, comprising actuating and control devices of the thrust reverser including hydraulic cylinders and locks having first hydraulic supply solenoid valves, and sensors, the hydraulic drive system comprising:
   an electronic concentration module distinct from a computer, operable to concentrate data related to an operation of the actuating and control devices of the thrust reverser, the computer being a full authority computer for the turbojet engine or an avionics computer for the aircraft for providing thrust reversal orders, the electronic concentration module comprising:
a plurality of internal drive contactors for driving the first hydraulic supply solenoid valves;
a monitoring device for monitoring the sensors;
a data processing device configured to process sequencing of the actuating and control devices; and
a communication bus connected to the computer,
wherein at least one internal drive contactor of the plurality of internal drive contactors is piloted by the data processing device and, together with the computer, drives at least one of the first hydraulic solenoid valves such that the at least one of the first hydraulic solenoid valves is driven by firstly, a command by the computer and then, secondly, a command by the data processing device, and
wherein another ones of the internal drive contactors of the concentration module independently drive second hydraulic supply solenoid valves, such that the second hydraulic supply solenoid valves are driven only by the data processing device.

* * * * *